P. Clark.
Brick Machine.
N° 86,732.   Patented Feb. 9, 1869.
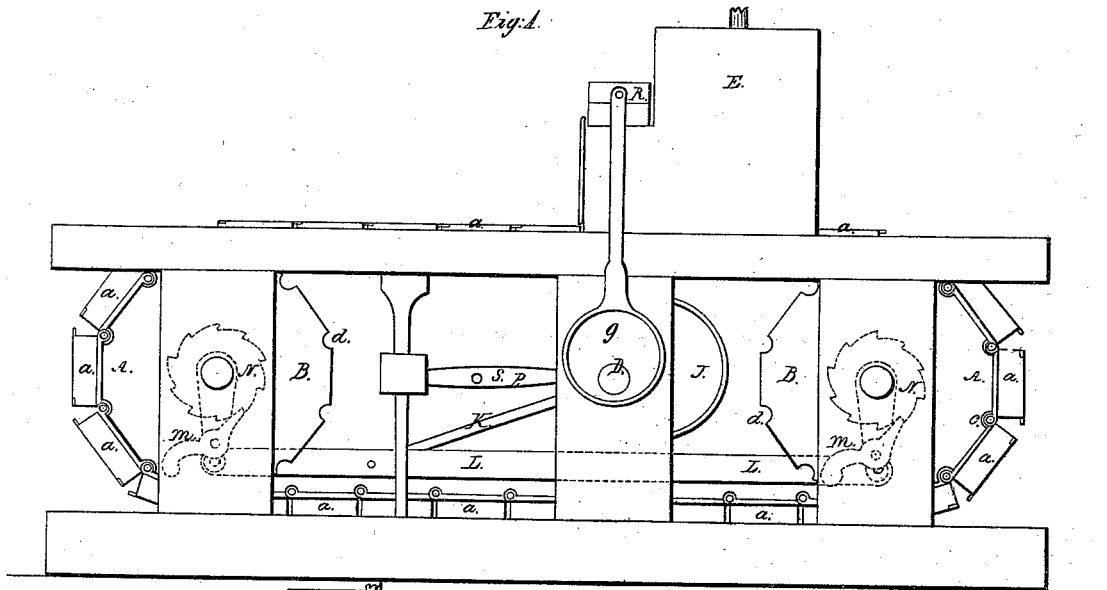
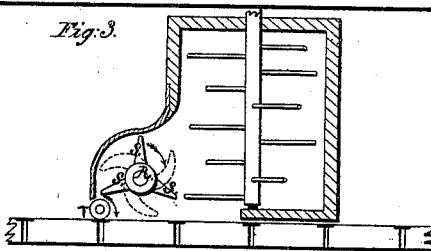
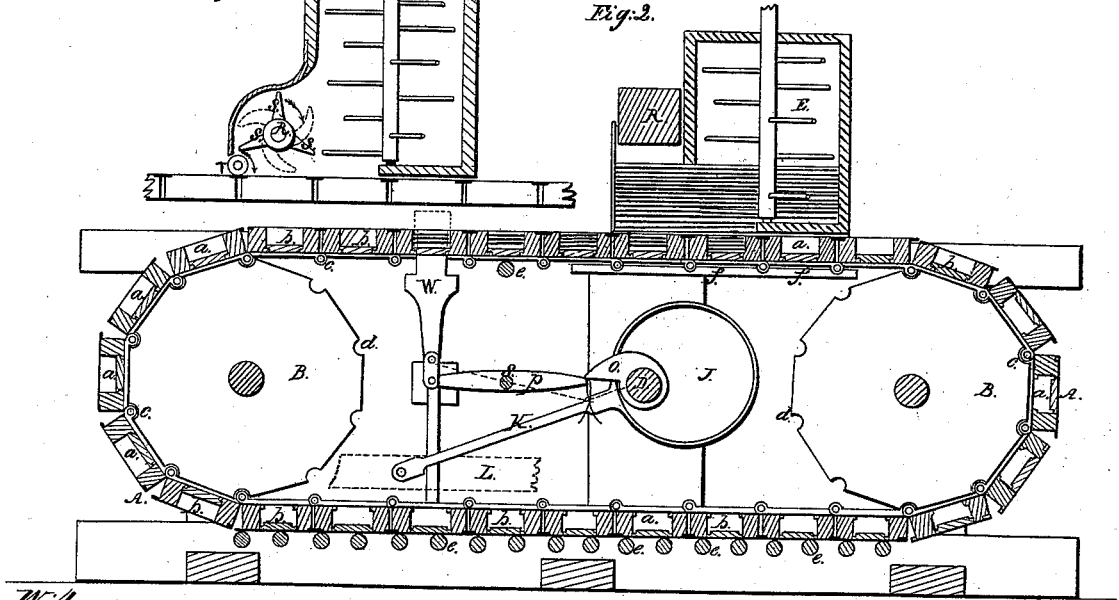
Witnesses:
H. H. Young
Gilbert B. Fowler
Inventor:
Peter Clark
by David A. Burr
Atty.

PETER CLARK, OF BROOKLYN, NEW YORK.

Letters Patent No. 86,732, dated February 9, 1869; antedated January 30, 1869.

IMPROVED BRICK-MACHINE.

The Schedule referred to in these Letters Patent and making part of the same.

*To all whom it may concern:*

Be it known that I, PETER CLARK, of Brooklyn, in the county of Kings, and State of New York, have invented a new and improved Brick-Machine; and I do hereby declare the following to be a full and exact description thereof, reference being had to the accompanying drawings, forming a part of this specification, in which—

Figure 1 is an elevation;

Figure 2, a central vertical and longitudinal section thereof; and

Figure 3, a detached view of an improved device for filling the moulds.

Similar letters indicate like parts in each of said figures.

The nature of my improvement consists in combining, with an endless chain of moulds provided with platens, or movable bottoms, and revolving under a suitable pug-mill, mud-box, and pressing-plate, a tripping-lever, operating against said platens or movable bottoms, to insure an upward delivery of the bricks from the moulds.

To enable others skilled in the art to make and use my invention, I will proceed to describe its construction and operation.

The endless chain of moulds is composed of a series of moulds, *a a*, made of iron or wood, or of the two combined, each mould containing one or more bricks, and each forming a link of the chain A.

Each mould, *a*, has a movable bottom or platen, *b*, fig. 2, fitted to it, and prevented from falling out by a slight flange or projection upon its under inner surface.

These moulds *a a* are fastened together by strong hinges *c* at each end, and thus form an endless chain, A, of moulds, which passes around two polygonal wheels B B, one at each end of the machine.

The projecting parts of the hinges work into corresponding recesses, *d*, in the angles of the wheels, so as to secure a regular movement of the chain of moulds.

This chain is supported, both at the top and bottom, by rollers *e*, or other devices, fixed in the frame of the machine, except when it passes under the pug-mill and mortar-box, where it is supported by a firm, fixed bed-plate, *f*.

The machine is operated by the revolution of a main shaft, D, connected by suitable gearing with a steam-engine, or other motive-power. This shaft D, supported by the frame-work of the machine, extends through between the upper and lower lengths of the chain, near the rear end of the machine.

Upon this shaft D is placed centrally an eccentric, I, whose arm K takes hold of a beam, L, swung at each end from the shafts of the polygonal chain-wheels B B by means of suitable pivoted links.

Weighted pawls M M, (see dotted lines, fig. 1,) are also pivoted to each end of this swinging beam L, to engage ratchet-wheels N N, secured to said shafts.

Thus, as the main shaft D revolves, a reciprocating movement is given to the swinging beam L, causing its pawls to engage successively the teeth of the ratchets N N, and thereby impart an intermittent movement to the polygonal wheels B, and the chain of moulds A, each revolution of the main shaft causing the chain of moulds to be thrown forward a distance equal to the width of one of the same.

The pug-mill E of the machine may be of the usual kind, supplied with knives and wipers for cutting, mixing, and throwing down the clay into the moulds. It is placed at the rear end of the machine, and supported by the frame-work thereof. Its central vertical shaft is connected to and driven by the revolution of the main shaft through suitable intermediate gearing.

The pressing-plate R in the mud-box, immediately in front of the pug-mill, is placed directly over the main shaft, and is worked by two eccentrics, *g*, thereon, (see fig. 1,) one on each side of the machine, whose arms take hold of the pressing-plate R, and move it up and down.

As a substitute for the pressing-plate R, I prefer to secure the filling of the moulds by means of the device illustrated in the detached view, fig. 3, viz, by means of a wiper, R, of three or more floats, *s s*, placed horizontally in the mud-box, directly in front of the pug-mill. A rapid rotary motion is imparted to this wiper by means of spur-gearing, connecting it with the main shaft, so that its floats shall press down the mortar into the moulds as they pass underneath.

Instead of cutting off the excess of clay by the lower edge of the front side of the mud-box, as is ordinarily done, I insert directly under this edge a small roller, T, extending its entire length, to which is given, by suitable gearing from the main shaft, a rapid rotary motion in the direction indicated by the arrow in the drawing. This roller imparts a smooth surface to the upper side of the bricks as they pass out from the mud-box.

The floats *s s* of the wiper R, projecting from its horizontal shaft, may be made to project radially, as illustrated by positive lines in fig. 3, or be curved, as indicated by the red dotted lines.

An upward delivery of the bricks from the moulds is effected by means of two cams, O O, (see fig. 2,) on the main shaft D, which strike the inner ends of horizontal levers *p p*, supported and pivoted by means of a central fulcrum-shaft, S, passing through the same, at right angles thereto.

The outer ends of these lifting-levers, *p p*, are attached to a plunger or head, W, which is thrown upward by the cams O O, and bearing against the platens *b* in the moulds, will thereby lift the same and raise the bricks up out of the moulds, when they may be removed by hand, and placed upon an endless platform, to be carried through a drying-oven, if one be used, or otherwise, upon boards, to be carried away to the drying-floor.

The machinery is so adjusted that the pressing-plate R, and the lifting-levers $p$ $p$ do their work while the chain A of moulds is at rest, viz, while the pawls M are being drawn back from tooth to tooth of the ratchet-wheels N. The weight of the head W upon the lifting-levers $p$ $p$ causes it to drop to its position below the moulds so soon as the cams O O pass and release the inner ends of said levers.

The platens, or movable bottoms $b$ $b$ of the moulds, are so nicely fitted and packed that they will not fall back into the moulds by their own weight, and they are prevented from falling out, as they pass along the under side of the machine, by the lower series of rollers, $e$ $e$, or other supports sustaining the chain of moulds.

As the moulds pass under the pug-mill, the weight of the clay and the action of the pressing-plate will force the platens to the bottom of the moulds again.

To avoid the adhesion of the clay to these sliding bottoms, their upper surface is covered with a fine felt, or, if the platens are used without felt lining, they may be sanded before they pass under the pug-mill.

As a further protection against an adhesion of the bricks to the moulds, a jet of exhaust-steam may be thrown upon them, behind the pug-mill, as they pass under it, covering the inside of the moulds with moisture, and thereby facilitating the delivery of the bricks.

The arm K of the eccentric I, on the centre of the main shaft, may be disengaged at pleasure from the beam L, and the gearings connecting the pug-mill with the main shaft may also be disconnected, so as to allow the brick-making machine and the pug-mill to be worked independently of each other, if desired.

To prevent the clay from the pug-mill from passing down between the moulds, I secure to the rear edge of each mould a projecting flange, X, and form a recess in the edge of the next following mould to receive it.

Having thus fully described my invention,

What I claim therein as new, and desire to secure by Letters Patent, is—

The combination, in my improved brick-machine, of one or more cam-actuated tripping-levers $p$, with movable bottoms or platens $b$, working in moulds which are united in an endless chain, A, and which revolve, with an intermittent movement, under a pug-mill, E, and compressing-plate R, all substantially as herein set forth.

The foregoing specification of my improvements in brick-machines, signed by me, this 26th day of June, 1868.

PETER CLARK.

Witnesses:
DAVID A. BURR,
H. H. YOUNG.